April 29, 1969   G. S. BAHRS ET AL   3,441,833
REGULATED POWER SUPPLY HAVING CURRENT COMPARATOR
REFERENCED TO COMMON CONDUCTOR
Filed May 26, 1958
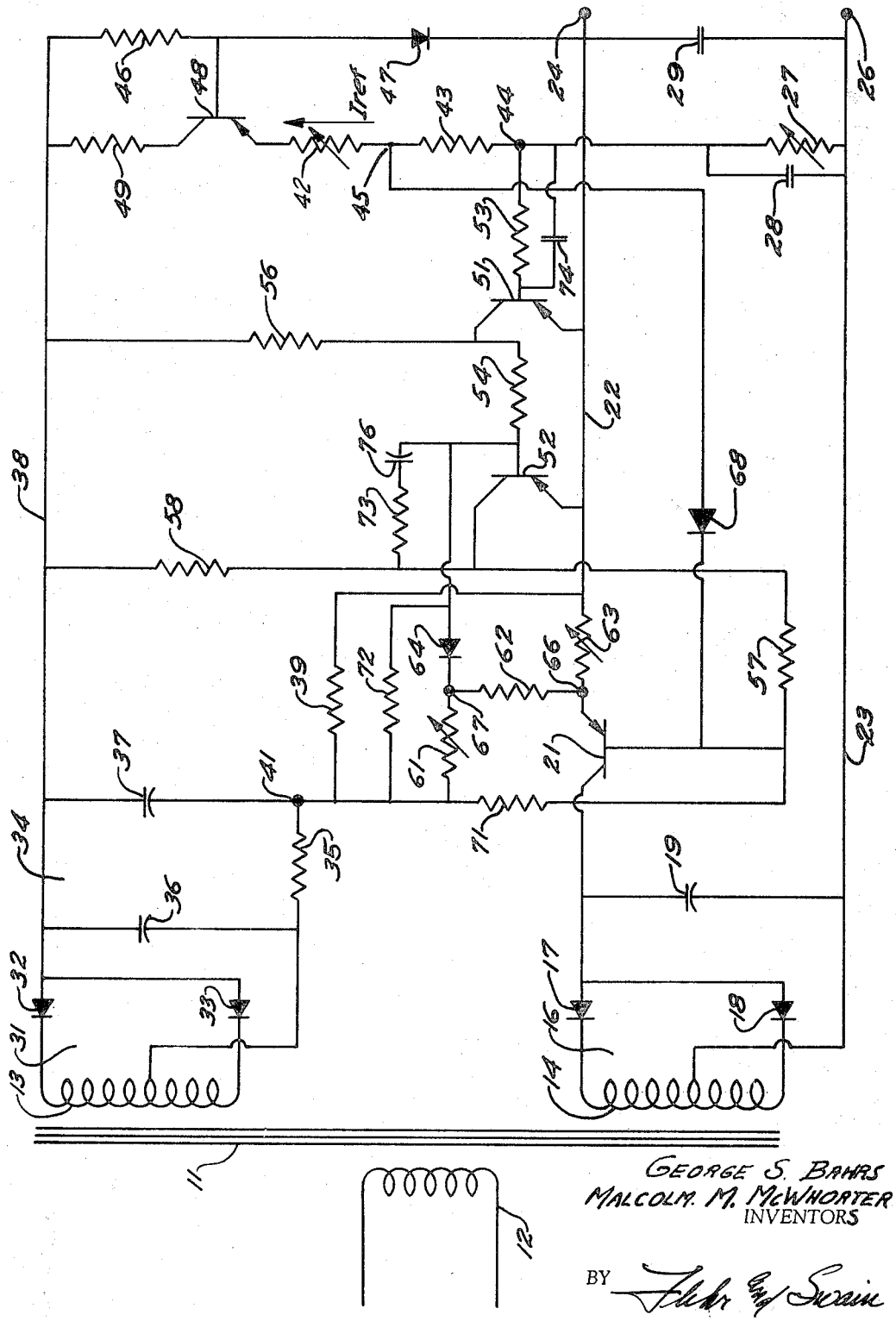
GEORGE S. BAHRS
MALCOLM M. McWHORTER
INVENTORS
BY *Fehr & Swain*
ATTORNEYS United States Patent Office 3,441,833
Patented Apr. 29, 1969

3,441,833
REGULATED POWER SUPPLY HAVING CURRENT COMPARATOR REFERENCED TO COMMON CONDUCTOR
George S. Bahrs and Malcolm M. McWhorter, Menlo Park, Calif., assignors to Hewlett-Packard Company, Palo Alto, Calif., a corporation of California
Filed May 26, 1958, Ser. No. 737,788
Int. Cl. G05f 1/10
U.S. Cl. 323—9   16 Claims

ABSTRACT OF THE DISCLOSURE

A voltage regulated power supply with a transistor and a current limiting resistor connected in series between the input and output of the supply. A current proportional to the output voltage is compared to a fixed reference current. Any difference current activates a D-C amplifier to control the transistor and maintain the output voltage at a predetermined value. The current limiting resistor develops a voltage proportional to the output current and is employed to limit the output current.

---

This invention relates to a regulated power supply, and more particularly to a transistor regulated power supply.

Power supplies including a series regulating transistor and an amplifying transistor connected in circuit therewith and serving to control the current flow are known in the art. Generally, the amplifying transistor samples the output voltage and develops a control signal which is applied to the series regulating transistor. In circuits of this type, the power from the rectifier-filter combination is coupled into the control loop. Voltage variations and ripple in the supply are, therefore, introduced in the output. The control transistor in a circuit of the above character generally has nearly full output voltage applied thereto, and it, therefore, becomes necessary to employ medium power, high voltage transistors which are relatively expensive. In many regulated power supplies of the character described it is difficult to arrange the circuit so that the output may be adjusted over the full range from full output down to zero volts. In certain prior art circuit configurations, high surge voltages are produced when the supply is turned on and off. It is also difficult to provide means for limiting the output current to predetermined adjustable maximum values which are independent of the output voltage setting.

It is a general object of the present invention to provide an improved transistor regulated power supply.

It is another object of the present invention to provide a transistor regulated power supply which has low output impedance, improved regulation, and extremely low ripple.

It is a further object of the present invention to provide a transistorized regulated power supply in which low power, low voltage, inexpensive transistors may be used in the control loop.

It is a further object of the present invention to provide a transistor regulated power supply which includes a pair of supplies, one adapted to provide output power, and the other adapted to supply power to the control loop whereby the control circuit is operated independently of the power circuit.

It is a further object of the present invention to provide a transistorized power supply in which the control loop is connected between base and emitter of the series regulating transistor.

It is still a further object of the present invention to provide a transistorized power supply which may be adjusted to limit current to a predetermined maximum value, which maximum value of current is adjustable over a wide range of values independently of output voltage.

It is another object of the present invention to provide a power supply capable of being adjusted to any desired voltage within the range of zero to full output.

It is another object of the present invention to provide a transistorized power supply which may be turned on and off without causing serious voltage surges to appear at the output.

It is still a further object of the present invention to provide a transistorized power supply which operates satisfactorily over a wide range of temperatures.

These and other objects of the invention will become more clearly apparent from the following description when taken in conjunction with the single drawing presented.

The power supply includes a transformer 11 having primary winding 12 and a pair of secondary windings 13 and 14. The secondary winding 14 is connected in a full wave rectifier circuit 16 which includes the rectifying diodes 17 and 18. A suitable filter condenser 19 is provided for filtering the output of the diodes.

A series regulating transistor 21 is connected with its emitter and collector in series with the output line 22. The transistor 21 regulates the output voltage by regulating or controlling the current flow to the output terminals. The transistor 21 is controlled by controlling the current flow in the base whereby the effective D-C resistance between the emitter and collector is varied to vary the current and to compensate for changes in the rectifier output voltage. The line 23 is connected to the other terminal of the rectifier circuit 16, and the regulated output voltage is obtained at the terminals 24 and 26.

The magnitude of the regulated output voltage may be adjusted by changing the variable resistor 27. A capacitor 28 is connected in shunt with the variable resistor 27 and serves to increase the high frequency loop gain. A capacitor 29 is connected across the output terminals and serves to stabilize operation of the supply and bypass high frequency components.

The secondary winding 13 of the transformer 11 is connected in a full wave rectifier circuit 31 which includes a pair of rectifying diodes 32 and 33. The output of the rectifier is applied to a filter 34 which comprises the capacitors 36 and 37 and the resistor 35. This supply is hereinafter referred to as the "control supply." The positive terminal of the control supply is resistively connected through the resistor 39 to the line 22 whereby a positive potential exists between the point 41 and the line 22. The negative terminal of the control supply is connected to the line 38 which, in turn, is connected to the various transistors of the control circuit in a manner to be presently described.

In the instant invention, control is achieved by comparing the current flowing through the adjustable resistor 27 with a fixed reference current, $I_{ref}$. The difference current is employed to activate a D-C amplifier circuit which controls the base current of the transistor 21.

A constant current $I_{ref}$ is derived by applying a constant voltage across a resistance. The resistance comprises serially connected resistors 42 and 43 having one terminal connected to the node 44. The voltage at node 44 is substantially equal to the voltage on line 22, differing only by the relatively small emitter-to-base voltage of transistor 51. The constant voltage is furnished to the other terminal of the resistance by the combination of resistor 46 and the reference diode 47. The common terminal of these elements is connected to the base of the transistor 48 which is connected in what is substantially an emitter follower configuration whereby the emitter, which is connected to the resistor 42, is maintained at said constant voltage. A relatively small collector resistance 49 is added to reduce the collector voltage and thereby reduce the dissipation for the emitter follower. Consequently, a relatively low voltage, low power transistor may be employed. Addition of the resistor 49 also improves regulation against control supply voltage changes. The circuit described for deriving the reference current $I_{ref}$ has the advantage that the reference current is relatively independent of variations in the voltage applied between the lines 22 and 38.

Other means might be adopted for developing a reference current $I_{ref}$. For example, the transistor 48 may be omitted and the resistor 42 directly connected to the common terminal of the resistor 46 and reference diode 47. However, in such instance, in order to obtain a reference current of the magnitude required in the present circuit, the value of the resistor 46 should be made relatively small causing the reference current to be more dependent upon the voltage between the lines 22 and 38.

The control circuit for controlling the current drawn from the base of the transistor 21 comprises the direct coupled transistors 51 and 52, each of which is connected in the common emitter orientation. The base of the transistor 51 is connected by the current limiting resistor 53 to the common node 44. Resistor 53 is provided to limit the capacitor 28 discharge current through the emitter-base junction of transistor 51 when the output terminals 24 and 26 are shorted and is small compared to the input impedance of transistor 51. Capacitor 74 in shunt with resistor 53 provides an unattenuated signal path around the resistor for high frequencies. The base of the transistor 52 is connected to the collector of the transistor 51 by the dropping resistor 54. The collector of the transistor 51 is resistively connected through resistor 56 to the line 38. The base of the series regulating transistor 21 is connected by the dropping resistor 57 to the collector of the transistor 52. The collector of transistor 52 is connected by a resistor 58 to the line 38.

Since the base-to-emitter voltage of the transistor 52 is small in comparison to the voltage applied between the lines 22 and 38, and since resistor 54 is small and has low drop, the voltage appearing across resistor 56 is relatively constant so that the current through resistor 56 is relatively constant. Similarly, the current through resistor 58 is relatively constant. These currents are, of course, subject to any voltage variations appearing on line 38. The important point is that any change in the collector current of transistor 51 causes nearly the same change in the base current of transistor 52. Similarly, current changes in the collector current of transistor 52 are transferred to the base of transistor 21. Thus, the current gain between the node 44 and the collector of transistor 21 is nearly equal to the product of the current gains for transistors 51, 52 and 21. This product may be in the order of 50,000.

Small changes in the base current of transistor 51 are, therefore, amplified and alter the base current of the series regulating transistor in such a manner as to raise or lower the output voltage until the current through variable resistance 27 very nearly balances the constant reference current flowing through resistors 42 and 43.

Whenever the current through resistance 27 is significantly different from the reference current, the base current of transistor 51 will differ from its equilibrium value. Stimulated by this change of input current, the control amplifier will act to so control series regulating transistor 21 that the output voltage is adjusted until the current through variable resistance 27 nearly balances the reference current. The higher the setting of resistor 27, the higher will be the output voltage, at which current balance occurs. The control loop thus acts to maintain the output voltage at a value directly proportional to the setting of variable resistance 27.

A more detailed explanation is as follows: When the output voltage is equal to the desired value, the current through the resistor 27 is nearly equal to the reference current $I_{ref}$. If the value of the voltage rises to a point above the desired value, then the current through the resistor 27 will increase and less current will be drawn from the base of the transistor 51. The current at the collector of the transistor 51 is reduced by beta times the reduction of current at the base. With less current being drawn at the collector, more of the current flowing through resistor 56 appears at the base of the transistor 52. More current will then flow in the collector of the transistor 52 by a factor of beta times the change in its base current. Since the resistor 58 acts approximately as a constant current source, this increase in transistor 52 current serves to reduce the base current of transistor 21, thereby reducing the output current and consequently reducing the output voltage.

It is apparent that if the output voltage is reduced below the required value, then the current drawn from the base of the transistor 51 increases, thereby increasing the current flow at its collector, thus decreasing the current flow at the base of the transistor 52 and decreasing the current flow at its collector. This decrease in transistor 52 current allows more current flow from the base of transistor 21, thus increasing the output current and thereby increasing the output voltage.

It is noted that very low voltages are applied to the transistors 51 and 52. Thus, relatively low power, low voltage transistors may be employed. The circuit combination provides high current gain, the gain being substantially equal to the product of the betas of the three transistors 21, 51 and 52. Consequently, exceptionally good regulation is obtained.

As mentioned previously, this regulated power supply provides means whereby the output current may be limited to a predetermined adjustable maximum value. For this purpose, the circuit combination employing the adjustable resistor 61, resistor 62, adjustable resistor 63 and diode 64 is added. The adjustable resistor 63, connected in series with the emitter of the transistor 21, serves to develop a voltage that is proportional to the output current. This negative voltage and the positive voltage appearing at node 41 are mixed by resistors 61 and 62. The resultant composite voltage appearing at node 67 is applied to diode 64. The resistor 61 is made adjustable to provide a convenient means for calibrating the current limiter.

When the output current is small, the voltage at node 66, with respect to line 22, will be very nearly zero. The voltage at node 67 will then be positive, and diode 64 will not conduct. As the output current is increased, the negative voltage at node 66 increases. When the point 66 becomes sufficiently negative, the point 67 reaches a voltage value at which the diode 64 begins to conduct. When the diode 64 conducts, it increases the base current of transistor 52, thereby increasing the current in its collector, and decreasing the base current of transistor 21, thus limiting the output current. The current level at which limiting occurs is controlled by the setting of adjustable resistor 63. The adjustable resistor 63 is operated by a front panel control that is calibrated in current. The calibration may be established as follows: The output of the supply is short-circuited. Resistor 61 is then adjusted until measured short-circuit current agrees with the dial setting on resistor 63.

Special circuit considerations are necessitated by collector leakage current $I_{co}$. Consider a transistor operating in a circuit that calls for some collector current designated, $I_{collector}$.

As the operating temperature is elevated, $I_{co}$ may well exceed $$\frac{I_{collector}}{\beta}$$

in which case the direction of required base current will reverse. That is, in order to keep the collector current down to the desired value, it will be necessary to drain off a reverse base current rather than to supply a forward base current. It is to serve this function that resistors 71 and 72 are connected to the bases of transistors 21 and 52 and returned to node 41 which is at a positive potential. The current flowing through resistors 71 and 72 is in such a direction as to tend to turn off the transistors to which they are applied. These reverse base currents will be called "$I_{co}$ sump" currents.

It is not necessary to provide special "$I_{co}$ sump" elements for transistor 51 since the summing network connected to the base of transistor 51 can furnish a current flow in either direction, depending upon whether the current through resistance 27 is greater or smaller than $I_{ref}$. A change in the $I_{co}$ of transistor 51 causes a fractional change in the output voltage of approximately $$\frac{\Delta I_{co}}{I_{ref}}$$

So that the output voltage is not appreciably effected by temperature changes, preferably transistor 51 should have an $I_{co}$ that is small relative to $I_{ref}$.

Even though the circuit is arranged to draw off adequate "$I_{co}$ sump" current to reverse bias the base, the collector current for transistor 21 can never be less than $I_{co}$. From the type of power transistor used as the series regulator, $I_{co}$ may reach 5 ma. at elevated temperatures. Unless some means were provided for draining off this current from the output, the output voltage would go up to the full supply voltage whenever the load current dropped below $I_{co}$. This problem is conveniently overcome by making the reference current greater than the maximum anticipated $I_{co}$. Thus, since the equilibrium current through resistor 27 is nearly equal to the reference current, resistor 27 always draws a current that is larger than $I_{co}$.

Diode 68 is added to prevent excessive voltage surges from occurring after the power is shut off. The need for this element stems from the fact that capacitor 19 is much larger than capacitors 36 and 37. When the main power is turned off, the voltages of the main supply and the control supply decay as their respective filter capacitors discharge. Since the main supply has a much larger capacitor than does the control supply, when the external load current is small, the main supply voltage decays much more slowly than does the control supply. This means that after the control supply has discharged and there is no longer very much "$I_{co}$ sump" current, the main supply condenser still has considerable charge. Under these conditions, the series regulating transistor will turn itself on because of its $I_{co}$, and the output voltage will rise sharply until the main supply capacitor is discharged. This voltage surge could very easily damage the circuits being operated from the supply.

To avoid such voltage surges, diode 68 is connected between the base of transistor 21 and node 45. Diode 68 is normally cut off because node 45 is negative with respect to the base of transistor 21 due to the flow of reference current through resistor 43. When the supply is turned off and the control supply discharges, the flow of reference current will cease. The flow of current through resistor 27 then makes node 45 positive. Diode 68 then conducts, tending to turn off the series regulator and then to limit the output voltage during the time capacitor 19 is discharging.

A transistor power supply was constructed in accordance with the foregoing in which the various components had the following values:

The transformer 11 was known by manufacturer's specifications as Hewlett-Packard 910–168.

The crystal rectifiers 17 and 18, 32 and 33 were known by manufacturer's specifications as Hewlett-Packard 212–134.

The reference diode 47 was known by manufacturer's specifications as G–29A–7A.

The limiting diodes 64 and 68 were known by manufacturer's specifications as Hewlett-Packard G–29A–7C.

The transistor 21 was known by manufacturer's specifications as 2N375.

The transistor 48 was known by manufacturer's specifications as 2N383.

Thet ransistors 51 and 52 were known by manufacturer's specifications as 2N65.

Resistors

| | Ohms |
|---|---|
| 27 | 5K |
| 38 | 620 |
| 39 | 330 |
| 42 | 2K |
| 43 | 150 |
| 46 | 22K |
| 49 | 560 |
| 53 | 560 |
| 54 | 1K |
| 56 | 15K |
| 57 | 150 |
| 58 | 680 |
| 61 | 5K |
| 62 | 47 |
| 63 | 5–35 |
| 71 | 680 |
| 72 | 15K |
| 73 | 560 |

Capacitors

| | Microfarads |
|---|---|
| 19 | 500 |
| 28 | 20 |
| 29 | 24 |
| 36 and 37, each | 50 |
| 74 | .0047 |
| 76 | .02 |

A power supply constructed in accordance with the foregoing showed a ripple voltage of less than 100 microvolts. With line voltage variations of plus and minus 10% about 115 volts, the regulation was better than ±0.12% or 10 millivolts. For line voltages within the above range, the no load to full load regulation was better than 0.10% or 12 millivolts. By means of a high speed relay, a 150 milliamp load was switched on and off at 30 cycles per second. The resulting output transient was observed on an oscilloscope. The transient which occurs in going from no load to full load was 0.2 millisecond in duration with a maximum amplitude of 0.5 volt. For the change from full load to no load, the transient lasted 0.6 millisecond with a maximum amplitude of 0.5 volt. An instantaneous change of line voltage of 10% led to initial output transient of less than 4 microvolts. The internal impedance of the device at 5 volts is .06 ohm in series with 3 microhenries maximum. At 30 volts output, the internal impedance is 0.15 ohm in series with 30 microhenries maximum. The supply was operated on full load for two hours in an oven maintained at 50° C.; the no load to full load regulation was found to be within 10% of that at room temperature.

Thus, it is seen that a greatly improved power supply having improved characteristics as to regulation, ripple, output voltage, transient recovery and the like is provided. The power supply employs relatively inexpensive transistors in the control circuit and is efficient in operation. The supply includes means for limiting the output current to an adjustable predetermined value and for preventing excessive output voltage surges.

We claim:

1. A regulated power supply having at least two output terminals comprising an output supply having first and second output supply lines, a control supply having first and second control supply lines, a common line connected to the second output terminal, said other output terminal being connected to the first output supply line, a series regulating transistor having emitter, base and collector electrodes with its collector connected to the second output supply line and its emitter connected to the common line, means connected to the control supply lines and to the common line for deriving a reference current, resistive means connected to the first output terminal serving to derive a current proportional to the output voltage, a transistor amplifier connected to receive said currents and amplify the difference between the same, said amplifier serving to receive power from the control supply and being connected between the common line and the base of the series regulating transistor to control the current flowing in the base of the series regulating transistor to control the impedance between the collector and emitter electrodes of said transistor.

2. A regulated power supply having at least two output terminals comprising an output supply having first and second output supply lines, a control supply having first and second control supply lines, a common line connected to the second output terminal, said other output terminal being connected to the first output supply line, a series regulating transistor having emitter, base and collector electrodes with its collector connected to the second output supply line and its emitter connected to the common line, means connected to the control supply lines and to the common line for deriving a reference current, resistive means connected to the first output terminal serving to derive a current proportional to the output voltage, a transistor amplifier connected to receive said currents and amplify the difference between the same, said amplifier including first and second transistors each having emitter, base and collector electrodes, said transistors being connected in cascade with the emitters connected to the common line and the collectors resistively connected to the first control supply line, the base of the first transistor being connected to receive the reference current and the current proportional to the output voltage, the base of the second transistor being resistively connected to the collector of the first, and the collector of the second transistor being resistively connected to the base of the series regulating transistor to control the current flowing in the base of the series regulating transistor to control the impedance between the collector and emitter electrodes.

3. A regulated power supply having at least two output terminals comprising an output supply having first and second output supply lines, a control supply having first and second control supply lines, a common line connected to the second output terminal, and other output terminal being connected to the first output supply line, a series regulating transistor having emitter, base and collector electrodes with its collector connected to the second output supply line and its emitter connected to the common line, means connected to the control supply lines and to the common line for deriving a reference current, resistive means connected to the first output terminal serving to derive a current proportional to the output voltage, a transistor amplifier connected to receive said currents and amplify the difference between the same, said amplifier including first and second transistors each having emitter, base and collector electrodes, said transistors being connected in cascade with the emitters connected to the common line and the collectors resistively connected to the first control supply line, the base of the first transistor being connected to receive the reference current and the current proportional to the output voltage, the base of the second transistor being resistively connected to the collector of the first, the collector of the second transistor being resistively connected to the base of the series regulating transistor to control the current flowing in the base of the series regulating transistor to control the impedance between the collector and emitter electrodes, a resistor connected in series between the emitter and common line, resistive means serving to connect the second control supply line to the common line, resistive means serving to connect the base of said series regulating transistor to said second control supply line and a non-linear circuit element connected to receive a voltage from the emitter of said series regulating transistor and a voltage from said second control supply line and serving to control the collector current of said second transistor to limit the current flowing through the series regulating transistor.

4. A regulated power supply having at least two output terminals comprising an output supply having first and second output supply lines, a control supply having first and second control supply lines, a common line connected to the second output terminal, said other output terminal being connected to the first output supply line, a series regulating transistor having emitter, base and collector electrodes with its collector connected to the second output supply line and its emitter connected to the common line, means connected to the control supply lines and to the common line for deriving a reference current, resistive means connected to the first output terminal serving to derive the current proportional to the output voltage, a transistor amplifier connected to receive said currents and amplify the difference between the same, said amplifier including first and second transistors each having emitter, base and collector electrodes, said transistors being connected in cascade with the emitters connected to the common line and the collectors resistively connected to the first control supply line, the base of the first transistor being connected to receive the reference current and the current proportional to the output voltage, the base of the second transistor being resistively connected to the collector of the first, the collector of the second transistor being resistively connected to the base of the series regulating transistor to control the current flowing in the base of the series regulating transistor to control the impedance between the collector and emitter electrodes, a resistor connected in series between the emitter and common line, resistive means serving to connect the second control supply line to the common line, resistive means serving to connect the base of said series regulating transistor to said second control supply line and a non-linear circuit element connected to receive a voltage from the emitter of said series regulating transistor and a voltage from said second control supply line and serving to control the collector current of said second transistor to limit the current flowing through the series regulating transistor, and a non-linear circuit element connected between the base of the series regulating transistor and said means for deriving a reference current.

5. A regulated power supply for producing an output voltage, said power supply comprising an unregulated supply and a control supply, a regulating transistor having input and output circuits, said output circuit being connected in series with the unregulated supply for supplying the output voltage, means connected to receive power from said control supply and being adapted to provide a reference current, resistance means for forming a current proportional to said output voltage, and amplifying means having input and output circuits, the input and output circuits of each of the regulating transistor and amplifying means being directly connected to a common conductor, the amplifying means being responsive to the difference between said currents applied to the input circuit thereof and being connected to control the resistance of said transistor.

6. A regulated power supply for producing an output voltage, said power supply comprising an unregulated supply and a control supply, a regulating transistor having at least emitter, base and collector electrodes forming input and output circuits, the emitter and collector electrodes which form the output circuit of the regulating transistor being connected in series with the unregulated supply for supplying the output voltage, means connected to receive power from said control supply and being adapted to provide a reference current, an adjustable resistance connected to receive the output voltage and being adapted to derive a current proportional to the output voltage, the adjustment of said resistance serving to establish the output voltage, amplifying means having input and output circuits and being responsive to the difference between said currents, the output circuit of the amplifying means being connected to control the current in the input circuit of the regulating transistor thereby to control the emitter-to-collector resistance, a resistor connecting said emitter to the input and output circuits of the amplifying means, the input and output circuits of each of the regulating transistor and amplifying means being substantially at the same potential, and circuit means including a non-linear circuit element and connected to act upon the amplifying means to limit the output current to predetermined values, said circuit means being responsive to a voltage from the control supply and the voltage across said resistor.

7. A regulated power supply according to claim 6 wherein said resistor is adjustable to limit the output current to a desired value and resistance means are connected between the base of said transistor and said control supply for drawing a reverse base current.

8. A regulated power supply for producing a n output voltage, said power supply comprising an unregulated power supply, a regulating transistor having emitter, collector and base electrodes forming input and output circuits, the emitter and collector electrodes which form the output circuit being connected in series with the unregulated supply for supplying the output voltage, a control supply, means connected to receive power from said control supply and being adapted to derive a reference current, means forming a current proportional to the output voltage, at least a second transistor having input and output circuits, the output circuit of the second transistor being connected between the emitter and base electrodes which form the input circuit of the regulating transistor and being adapted to control the current in the input circuit of the regulating transistor, means maintaining the input and output circuits of each of the regulating transistor and second transistor substantially at the same potential, said second transistor being responsive to the difference between said currents applied to the input circuit thereof.

9. A regulated power supply for producing an output voltage, said power supply comprising an unregulated supply and a control supply, a regulating transistor having emitter, base and collector electrodes forming input and output circuits, the emitter and collector electrodes which form the output circuit being connected in series with the unregulated supply for supplying the output voltage, means connected to receive power from said control supply and being adapted to provide a reference current, adjustably resistance means connected to receive the output voltage and being adapted to provide a current proportional to said voltage, the adjustment of said resistance means serving to establish the output voltage, an amplifier having input and output circuits and being connected to receive power from said control supply, the output of said amplifier being connected between the emitter and base electrodes which form the input circuit of the regulating transistor, the input and output circuits of each of the regulating transistor and amplifier being directly connected to a common conductor, said amplifier being adapted to amplify the difference between said currents applied to the input circuit thereof and being adapted to control the current in the input circuit of said regulating transistor.

10. A regulated power supply for producing an output voltage, said power supply comprising an unregulated supply and a control supply, positive and negative output terminals, a regulating transistor having emitter, base and collector electrodes connected with its emitter and collector electrodes in series between an output terminal and the unregulated supply, a conductor connecting the other input terminal and the unregulated supply, resistance means serving to connect the positive side of the control supply and the negative terminal, means connected to receive power from said control supply and being adapted to produce a reference current, an adjustable resistance connected to receive the output voltage and being adapted to provide a current proportional to said voltage, the adjustment of said resistance serving to establish the output voltage, a transistor amplifier having input and output circuits and being adapted to amplify the difference between said currents applied to the input circuit thereof, the output circuit of said amplifier being connected to control the base current flowing in said regulating transistor, a current sampling resistor connecting said emitter to the input and output circuits of said amplifier and serving to develop a voltage proportional to the output current, circuit means including a unidirectional conduction element having two terminals, said circuit means being connected in said amplifier to receive a voltage from the control supply and a portion of the voltage developed across said resistor, said circuit means being adapted to become conductive and to limit the current in the base electrode of the regulating transistor when the voltage drop across the current sampling resistor exceeds a predetermined value, and resistance means connecting the positive terminal of said control supply and the base of the regulating transistor to establish flow of reverse base current.

11. Apparatus according to claim 10 including a unidirectional conduction element connected between the base of said regulating transistor and said means developing a reference current.

12. A regulated power supply for producing an output voltage, said power supply comprising an unregulated supply and a control supply, a regulating transistor having emitter, base and collector electrodes forming input and output circuits, the emitter and collector electrodes which form said output circuit being connected in series with the unregulated supply for supplying the output voltage, means connected to receive power from said control supply and being adapted to provide a reference current, an adjustable resistance connected to receive the output voltage and being adapted to derive a current proportional to the output voltage, the adjustment of said resistance serving to establish the output voltage, an amplifier having input and output circuits and being connected to receive power from said control supply, the output circuit of said amplifier being connected to control the current in the input circuit of the regulating transistor, said amplifier being adapted to amplify the difference between said currents applied to the input circuit thereof and being adapted to control the current in the input circuit formed by the base and emitter electrodes of said regulating transistor, the input and output circuits of each of the regulating transistor and amplifier being directly connected to a common conductor, and a non-linear circuit element nected between the base electrode of the series regulating transistor and said means for developing a reference current.

13. A power supply for producing an output voltage, said power supply comprising a source of output voltage, a regulating element having a plurality of electrodes forming input and output circuits, the electrodes of the regulating element which form the output circuit thereof being connected in series with said source for supplying the output voltage, means for supplying a reference current, means for deriving a current which is proportional to the output voltage, amplifying means having input and output circuits, the output circuit of the amplifying means being connected to the input circuit of the regulating element, means maintaining the input and output circuits of each of the regulating element and amplifying means substantially at the same potential, and means to apply each of said currents to the input circuit of the amplifying means, the amplifying means being responsive to the difference of said currents to control the regulating element and acting to maintain the output voltage constant.

14. A regulated power supply for producing an output voltage, said power supply comprising a source of output voltage, a regulating transistor having at least three electrodes forming input and output circuits, the electrodes of the regulating transistor which form the output circuit thereof being connected in series with said source for supplying the output voltage, means for supplying a reference current, means for deriving a current which is proportional to the output voltage, amplifying means having input and output circuits, the output circuit of the amplifying means being connected to the input circuit of the regulating transistor, means maintaining the input and output circuits of each of the regulating transistor and amplifying means substantially at the same potential, and means to apply each of said currents to the input circuit of the amplifying means, the amplifying means being responsive to the difference of said currents to control the regulating transistor and acting to maintain the output voltage constant.

15. A regulated power supply for producing an output voltage, said power supply comprising an unregulated supply and a control supply, a regulating transistor having emitter, base and collector electrodes forming input and output circuits, the electrodes of the regulating transistor which form the output circuit thereof being connected in series with the unregulated supply for supplying the output voltage, means connected to receive power from the control supply and being adapted to provide a reference current, means for deriving a current which is proportional to the output voltage, amplifying means having input and output circuits, the output circuit of the amplifying means being connected to the input circuit of the regulating transistor, means maintaining the input and output circuits of each of the regulating transistor and amplifying means substantially at the same potential, and means to apply each of said currents to the input circuit of the amplifying means, the amplifying means being responsive to the difference of said currents to control the conductivity of the regulating transistor and acting to maintain the output voltage constant.

16. A regulated power supply for producing an output voltage, said power supply comprising an unregulated supply and a control supply, a regulating transistor having emitter, base and collector electrodes forming input and output circuits, the emitter and collector electrodes of the regulating transistor which form the output circuit thereof being connected in series with the unregulated supply for supplying the output voltage, means connected to receive power from the control supply and being adapted to provide a reference current, means for deriving a current which is proportional to the output voltage, amplifying means having input and output circuits, the output circuit of the amplifying means being connected to said base and emitter electrodes which form the input circuit of the regulating transistor, means maintaining the input and output circuits of each of the regulating transistor and amplifying means substantially at the same potential, and means to apply each of said currents to the input circuit of the amplifying means, the amplifying means being responsive to the difference of said currents to control the conductivity of the regulating transistor and acting to maintain the output voltage constant.

References Cited

UNITED STATES PATENTS

| | | | |
|---|---|---|---|
| 2,840,777 | 6/1958 | De Blasio | 323—22 |
| 2,594,006 | 4/1952 | Friend | 323—22 |
| 2,693,568 | 11/1954 | Chase | 323—22 |
| 2,697,811 | 12/1954 | Deming | 323—9 |
| 2,698,416 | 12/1954 | Sherr | 323—22 |
| 2,776,382 | 1/1957 | Jensen | 223—23 |
| 2,904,742 | 9/1959 | Chase | 323—22 |
| 2,915,693 | 12/1959 | Harrison | 323—22 |
| 2,942,174 | 6/1960 | Harrison | 323—22 |

JOHN F. COUCH, *Primary Examiner.*

A. D. PELLINEN, *Assistant Examiner.*

U.S. Cl. X.R.

323—22, 38

U.S. DEPARTMENT OF COMMERCE

PATENT OFFICE

Washington, D.C. 20231

UNITED STATES PATENT OFFICE
CERTIFICATE OF CORRECTION

Patent No. 3,441,833            April 29, 1969

George S. Bahrs et al.

It is certified that error appears in the above identified patent and that said Letters Patent are hereby corrected as shown below:

Column 5, line 21, after "be" insert -- made --. Column 6, line 3, "Thet ransistors" should read -- The transistors --. Column 7, line 46, "and" should read -- said --. Column 9, lines 50 and 51, "adjustably" should read -- adjustable --; lir 73, "input" should read -- output --. Column 10, line 54, "nected" should read -- connected --.

Signed and sealed this 5th day of May 1970.

(SEAL)
Attest:

Edward M. Fletcher, Jr.            WILLIAM E. SCHUYLER, JR.
Attesting Officer                    Commissioner of Patents